Jan. 28, 1958  M. B. FREEDMAN  2,821,626
PULSE AMPLITUDE DISCRIMINATOR
Filed Aug. 11, 1953

INVENTOR:
MELVIN B. FREEDMAN
BY: *Spencer E. Olson*
ATTORNEY

United States Patent Office 2,821,626
Patented Jan. 28, 1958

2,821,626

PULSE AMPLITUDE DISCRIMINATOR

Melvin B. Freedman, Roxbury, Mass., assignor to Tracerlab, Inc., Boston, Mass., a corporation of Massachusetts Application August 11, 1953, Serial No. 373,560

7 Claims. (Cl. 250—27)

This invention relates in general to discriminator circuits and more particularly to a pulse amplitude discriminator for use with fast radiation counters.

The scintillation detector, which comprises essentially a body of liquid or crystalline material which emits a brief flash of light in response to nuclear radiations and a photomultiplier tube for translating the light output into electrical pulses, is becoming increasingly popular in nuclear studies. Scintillation detector pulses are counted by suitable scalers or counting rate meters, the observed count in a predetermined time being a measure of the activity of the sample under study. The characteristics of the scintillation detector, and the nature of radioactivity itself, present a number of problems which must be met prior to application of the pulses to the counting circuit in order to achieve accurate and reproducible counting data. For example, the duration of a typical flash of light, or scintillation, is quite short, perhaps tens of millimicroseconds or less, so that many individual flashes might occur in a millionth of a second. In addition, radioactivity emanations are statistical in nature; i. e., the interval of time separating the arrival at some point of successive radiation particles is of random length. Consequently, if particles are received at an average rate of, say, ten thousand per second, corresponding to an average interval between them of one ten-thousandths of a second, then, by the laws of statistics, significant numbers of them will arrive within one hundred-thousandths of a second of their predecessors. When the particles are so closely spaced as not to be distinguished from each other, or resolved, by the electronic circuitry and counted as separate pulses, there is said to occur some percentage "resolution loss." It follows that to count random radiations at high average rates, electronic circuitry is required whose resolution is much greater than that required to count periodic signals of the same average rate. It is desirable to count at high rates because less time is required to obtain satisfactory measurements, an obvious advantage where many samples must be evaluated or where samples of short half-life are being measured. In some cases, the geometry of the experimental setup leaves no alternative but to accept large numbers of radiation particles and to count them with small or accurately defined resolution loss.

Besides being of short duration and randomly distributed, the output pulses from the scintillation detector may vary in duration and amplitude for a number of reasons. For proper counting it is desired that the light pulses in excess of a predetermined intensity, regardless of their duration, be translated into uniform square pulses of voltage prior to application to the counter circuit.

Various pulse height discriminators heretofore employed in this connection are not suitable for fast counting by virtue of their rather slow recovery time, or the requirement for critical and/or expensive circuit components. The usual process of pulse height discrimination is accomplished by the combined action of two devices: a threshold detector and a sensitive amplifying device. The threshold detector permits signals in excess of a predetermined amplitude to excite the amplifier which responds with an output signal of some standardized shape. The circuit illustrated in Fig. 1 is currently in widespread use in nuclear work, and combines the threshold and amplification functions in a regenerative circuit whose quiescent state depends on one half of the circuit keeping the tube of the other half cut off. Referring to Fig. 1, this prior art circuit includes a pair of tubes 10 and 11 having a common cathode resistor 12. Tubes 10 and 11 are energized from a source of B+ voltage through load resistors 13 and 14, respectively, and the plate of tube 10 is connected to the grid of tube 11 by the parallel combination of resistor 15 and condenser 16. Input pulses from a radiation detector, or other source, are applied to terminal 17 and coupled to the grid of tube 10 via capacitor 18, and output pulses are derived from terminals 19. The control grids of tubes 10 and 11 are connected to ground through resistors 20 and 21, respectively.

In the quiescent state, tube 11 is conducting current through resistor 12 thereby generating potential $E_K$ which appears on the cathode of tube 10. With the grid resistor 20 of tube 10 returned to ground (or zero potential), $E_K$ is sufficient to keep tube 10 cut off indefinitely. Tube 11 is able to maintain conduction in spite of the value of $E_K$ because its grid potential is maintained approximately equal in potential to $E_K$ by means of the positive conection via resistors 15 and 13.

An incoming positive pulse of sufficient amplitude to lift tube 10 out of cutoff will tend to lower the potential at the plate of tube 10 and at the grid of tube 11. This results in a diminished current through tube 11 which tends to lower $E_K$, further increasing the conduction of tube 10 and thus piling up the switchover from one state to the other very rapidly. If the potential applied to the grid of tube 10 could remain positive, the system would remain in the new condition. However, condenser 18 and resistor 20 constitute a limiting or "clipping" time constant to assure the return of the system to normal in a short time. The exponential decay of potential at the grid of tube 10, forced by condenser 18 and resistor 20, results ultimately in the return of tube 10 to cutoff, essentially retracing the regenerative cycle followed in the first transition.

Resistors 15 and 21 constitute the intertube coupling and are required in order to satisfy direct voltage relationships. These resistors must generally be large, so large in fact that capacitor 16 is required to transmit the high frequency components of intertube signals.

For each reversal of circuit equilibrium, capacitor 16 must change its charge from one to the other of the values of $E_{b_1}-E_{c_2}$. Both ends of capacitor 16 are connected to circuits of considerable resistance so that the time taken for complete transition of this circuit from one state to the other is determined by the time constant, capacitor 16 times all the effective series resistance in the charge path of capacitor 16.

To utilize this circuit in high resolution applications, it is necessary to make this time constant very small. A system for one-microsecond resolution would require a premium type tube with low circuit resistances with the attendant high current drain, or an extremely small capacitor 16 equal in value to representative values of stray circuit capacitances, or both. These constitute critical and uneconomical circuitry.

Another previously known circuit for pulse height discrimination is the so-called "Multiar" circuit described on pages 343–348 of volume 19 of the "Radiation Laboratory Series," McGraw-Hill Book Company, Inc., 1949. This circuit is reasonably effective for use as an amplitude discriminator, but where extremely short, closely recurring pulses are encountered, a relatively costly transformer is necessary for proper resolution, and few indeed are available whose demagnetization time and other properties are suitable.

With an appreciation of the foregoing shortcomings of prior art pulse height discriminators, applicant has as a primary object of the present invention the provision of a new and improved pulse amplitude discriminator.

A further object of the present invention is to provide a pulse height discriminator circuit for use with a scintillation detector.

Another object of the present invention is to provide a circuit for receiving pulses of varying amplitude and duration and converting them to pulses of uniform character.

Another object of the present invention is to provide a pulse amplitude discriminator capable of resolving pulses of short duration separated by extremely short time intervals.

A still further object of the invention is to provide a pulse height discriminator capable of rejecting pulses at its input whose amplitudes are below a predetermined arbitrary level.

Another object of the invention is to provide a circuit having the foregoing characteristics without the need for critical or expensive circuit components.

Other objects and advantages of the invention will be apparent from the following description considered in connection with the accompanying drawing in which.

Figure 1:
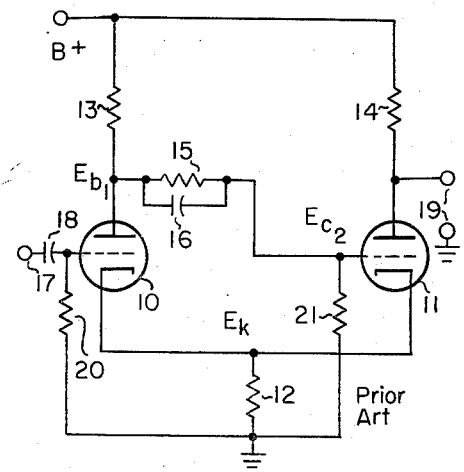
Fig. 1 is a schematic diagram of the prior art pulse height discriminator described hereinabove and to which further reference will not be made.
Figure 2:
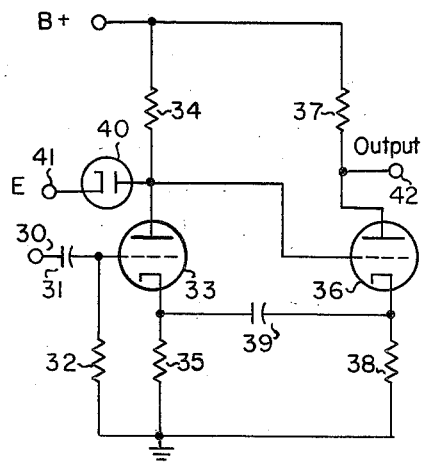
Fig. 2 is a schematic diagram of a general form of the present invention.

Referring to the drawing, and more particularly to Fig. 2, there is shown an input terminal 30 to which positive input pulses are adapted to be applied from a source (not shown), as for example, the output terminal of an amplifier following the photomultiplier tube of a scintillation detector. The input pulses, of varying amplitude and duration, and random distribution, are applied via an input circuit comprising capacitor 31 and resistor 32 to the control grid of tube 33 which has its anode energized through resistor 34 and its cathode connected to ground through resistor 35. In the case of this and the other tubes in the circuit diagrams, symbols representing the cathode heaters and heater voltage supply have been omitted for clarity.

The anode of tube 33 is directly connected to the control grid of tube 36 which has its anode energized through resistor 37 and its cathode connected to ground through resistor 38. A regenerative loop is provided from the anode of tube 33 to the grid of tube 36 to the cathode of tube 36 and back to the cathode of tube 33 through capacitor 39 connected between the cathodes of the two tubes. A unidirectional conducting device 40, such as a thermionic diode, or a germanium crystal is connected to the anode of tube 33 with its cathode connected to a fixed source of voltage E via terminal 41. The potential E may be provided by a battery, or a voltage divider connected from B+ to ground, or a voltage regulator connected across a suitable voltage supply.

The present invention is based on the fact that vacuum tubes generally exhibit their lowest terminal impedances when loaded in their cathode circuits and operated reasonably far out of cut-off. The anode and cathode resistors are of values such that neither of tube 33 or 36 are ever cut off either quiescently or during the regenerative pulse generating cycle of the circuit which will now be explained in detail.

In the quiescent condition of the circuit, both of tubes 33 and 36 are conducting, tube 36 conducting approximately three times as much current as tube 33. The value of E is so selected that during the quiescent conduction of tube 33, a small current flows through diode 40, sufficient to hold the voltage at the anode of tube 33 clamped to the value E in the absence of grid excitation, thus preventing oscillations. The normally conducting diode 40, in effect, acts as a shunt load on tube 33 keeping its gain, and hence the loop gain, well below unity. Under these conditions, the cathodes of both of tubes 33 and 36 exhibit low terminal impedances enabling capacitor 39 to be quite large relative to circuit stray capacitances, and still yielding short time constants.

An incoming positive pulse applied to the grid of tube 33 causes an increase in current therethrough with a consequent decrease in anode voltage, and if the negative excursion of the anode of tube 33 goes below the value of E, diode 40 is cut off and no longer acts as a low resistance load. That is, diode 40 ceases to limit the gain of tube 33, and the voltage at the anode goes down rapidly. This voltage change is directly coupled to the grid of tube 36 and appears on its cathode, is coupled through capacitor 39 to the cathode of tube 33 tending further to increase the current in tube 33. The voltage at the anode of tube 33 is depressed further by the reverse coupling and the action carries the circuit rapidly to a state with tube 33 conducting heavily and tube 36 nearly cut off, with a positive pulse being generated at the anode of tube 36, which may be coupled to a counter circuit via terminal 42. The system remains in this state until capacitor 39 has almost assumed the charge required by the new state. Tapering off of the charging current to capacitor 39 results in a diminution of feedback from tube 36 to tube 33, permitting the anode voltage of tube 33 to start rising. The increase of the anode voltage tube 33 starts a rise of the cathode of tube 36, which is transmitted to the cathode of tube 33 via capacitor 39 starting a cumulative pile-up of voltages in the opposite direction, ending the pulse at the anode of tube 36. The determining time constant for the pulse is the product of the capacitance of capacitor 39 with the terminal resistances of tube 33 and 36 in series, and since both tubes are conducting at all times, with consequent low impedance, the time constant can be made very short without recourse to an extremely small capacitor.

The system is basically monostable but can continue to generate pulses at a periodic rate as long as the grid of tube 33 is held sufficiently positive. For this reason, the input circuit is so chosen that the time constant of $C_{31}R_{32}$ is sufficiently shorter than the combined pulse duration and recovery time to insure that only one output pulse is generated for each input pulse. It should be understood that in an overall counting system, the limiting time constant $C_{31}R_{32}$ may be located more advantageously in some earlier part of the system rather than at the grid of tube 33.

It will be apparent from the foregoing description that the value of the voltage E determines the threshold below which an applied pulse will not produce an output pulse. So long as diode 40 continues to conduct during the application of an input pulse, the loop gain is less than unity, and while the input pulse causes some voltage change at the anode of tube 36, by virtue of cathode coupling, it is of much lower amplitude than the pulses generated when the system goes through its regenerative cycle, and may be eliminated by the input sensitivity of an amplifier or scaler to which the pulses are subsequently applied.

Figure 3:
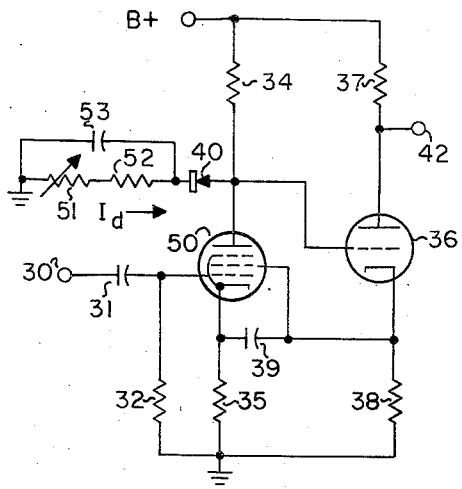
Fig. 3 is a circuit diagram of a preferred embodiment of the invention.

A preferred form of the invention is illustrated in Fig. 3 wherein a pentode 50 is used in the input section instead of the triode 33 in the circuit of Fig. 3. The circuit is otherwise basically the same as the Fig. 2 circuit, and like reference numerals have been used to designate corresponding components. The pentode 50 presents a somewhat lower loading capacitance to the driving source than a triode, but, in general, the operation is comparable. The suppressor grid of the pentode is directly connected to the cathode, and the screen grid is directly connected to the cathode of tube 36. This connection, in addition to being convenient, provides a quiescent regulatory loop from the anode of tube 50 to the grid of tube 36 to the cathode of tube 36 and to the screen grid of tube 50 which tends to regulate the voltage at the plate of tube 50, which in turn has a regulatory effect on the current $I_d$ through diode 40, and hence on the value of E. It will be understood, of course, that the screen grid may alternatively be connected to B+ directly or through a suitable resistance network.

The potential E in this case is generated by the flow of current, $I_d$, through resistors 51 and 52. These resistors are by-passed by a capacitor 53 sufficiently large that the value of E does not change appreciably during the time that diode 40 is cut off and a pulse is being generated by the system. Resistor 51 is adjustable in value to provide adjustment of the magnitude of E, and hence the threshold level of the circuit.

The sequence of operation of the circuit is identical with that previously described in connection with Fig. 2, and need not be repeated.

Figure 4:
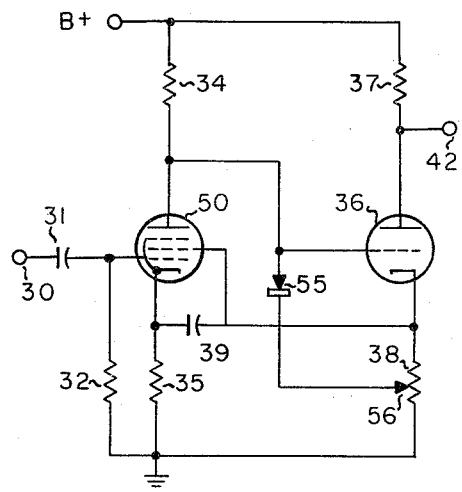
Fig. 4 is a schematic diagram illustrating a modification applicable to either of the circuits of Figs. 2 and 3.

An alternative connection of the diode to limit the quiescent value of loop gain to a sub-oscillatory value is illustrated in Fig. 4, the remaining circuit components being designated similarly to Fig. 3. Here, the diode 55 is connected between the anode of tube 50 (also grid of tube 36) and a point 56 on the cathode load resistor of tube 36. In the quiescent condition, the voltage differential between the anode of tube 50 and point 56 is such that diode 55 conducts, effectively short circuiting tube 36 so that voltage changes below a predetermined level do not produce an output signal, except for those resulting from cathode coupling. However, as the anode of tube 50 falls upon application of a sufficiently large positive input pulse, diode 55 is cut off, allowing the loop gain to increase and permitting the regenerative pulse-producing cycle to occur in the manner previously described. Adjustment of the position of point 56 affords control of the threshold level of the circuit.

It will be noted that if in the circuit of Fig. 4, the portion of resistor 38 above point 56 were removed, diode 55 would effectively be in parallel with the grid-to-cathode diode of tube 36, with the result that diode 55 would not be required to produce an operable circuit. Such a configuration, while it does work with a certain degree of effectiveness, is not preferred, because with tube 36 drawing grid current in the quiescent condition of the circuit there is no degenerative stabilization of quiescent diode current. It follows that diode 40 of each of the circuits of Figs. 2 and 3 could be omitted and the grid-to-cathode diode of tube 36 utilized to determine the threshold below which regeneration will not occur, but as in the case of the Fig. 4 circuit, they would lack the threshold stability required for many applications of the circuit.

In the normal application of the present circuit in radioactivity measurements, it is preceded by an amplifier which amplifies the pulses from a scintillation counter or other detector to a magnitude ranging between 5 and 70 volts, and as has been previously stated, these pulses have random distribution. The threshold level is set at approximately 5 volts, or other arbitrary value, so that input pulses in excess of this value produce corresponding output pulses. The components are so selected that the amplitude ratio of pulses appearing at the anode of tube 36 caused by cathode coupling and those caused by pulse generation is of the order of 1 to 10 whereby lower than threshold pulses can easily be eliminated by following circuitry. The combined pulse duration and recovery time of the circuit, both factors in determining the resolution efficiency, is less than .75 microsecond, of which about one half is the pulse width.

While the circuit of Fig. 2 has been described as including a pair of triodes, and the circuits of Figs. 3 and 4 as including a pentode as the input tube and a triode as the output tube, it will be understood that either triodes or pentodes, or tetrodes, or any combination thereof will provide a satisfactory circuit operable in the manner outlined above. Also, as has been mentioned the diode 40 may be one of several types. Thus, the selection of tubes is not critical, nor are any other components, including capacitor 39.

Various modifications, apart from those shown, may be made in the invention without departing from the spirit thereof and it is therefore intended that the invention not be limited to what has been shown and described except as such limitations occur in the appended claims.

What is claimed is:

1. A pulse height discriminating circuit having a short recovery time and adapted to generate an output pulse of uniform character for each positive input pulse applied thereto in excess of a predetermined threshold amplitude comprising, first and second electron tubes each having at least an anode, a cathode and a control grid, a direct connection between the anode of said first tube and the control grid of said second tube, a capacitor connected between the cathodes of said tubes, means energizing said tubes so as to be quiescently conducting, a diode connected between the anode of said first tube and a source of reference potential so as to be normally conducting and maintaining the gain of said tube below unity in the quiescent condition of said circuit, said reference potential being of such a magnitude that said diode is cut off upon the application to the grid of said first tube of a positive pulse in excess of said threshold amplitude thereby permitting the gain of said tube to increase beyond unity and causing regeneration of said circuit, means for deriving an output pulse from the anode of said second tube, the time constant determining said output pulse being the product of the capacitance of said capacitor and the series terminal resistances of said first and second tubes in their conducting condition, and an input circuit for said first tube comprising a capacitor and resistance the time constant of which is shorter than the combined output pulse duration and recovery time of said circuit.

2. A pulse height discriminating circuit adapted to produce output pulses of uniform amplitude and duration for each of a random series of positive input pulses in excess of a predetermined threshold amplitude comprising, first and second electron tubes each having at least an anode, a cathode and a control grid, first and second anode load resistors respectively connected between the anodes of said first and second tubes and a source of energizing potential, first and second cathode resistors respectively connected between the cathodes of said first and second tubes and a source of reference potential, a direct connection between the anode of said first tube and the grid of said second tube, a first capacitor connected between the cathodes of said tubes, and a diode and a resistor connected in series between the anode of said first tube and said source of reference potential with the anode of said diode connected to the anode of said first tube, and a second capacitor connected in parallel with said resistor, said diode being normally conducting and developing a biasing voltage across said resistor of such a value that the diode is cut off only upon the application to the grid of said first tube of positive pulses in excess of said threshold amplitude.

3. A pulse height discriminating circuit adapted to produce output pulses of uniform amplitude and duration for each of a random series of positive input pulses in excess of a predetermined threshold amplitude comprising, first and second electron tubes each having at least an anode, a cathode and a control grid, first and second anode load resistors respectively connected between the anode of said first and second tubes and a source of energizing potential, first and second cathode resistors respectively connected between the cathodes of said first and second tubes and a source of reference potential, a direct connection between the anode of said first tube and the grid of said second tube, a first capacitor connected between the cathodes of said tubes, a diode and a resistor connected in series between the anode of said first tube and said source of reference potential with the anode of said diode connected to the anode of said first tube, and a second capacitor connected in parallel with said resistor, said diode being normally conducting and developing a biasing voltage across said resistor of such a value that the diode is cut off only upon the application to the grid of said first tube of positive pulses in excess of said threshold amplitude, the non-conduction of said diode causing regeneration of said circuit and the production of an output pulse at the anode of said second tube, said second capacitor being of sufficient capacity to maintain said biasing voltage substantially constant for the duration of the regenerative cycle of said circuit, the time constant determining said output pulse being the product of the capacitance of said first capacitor and the series terminal resistances of said first and second tubes in their conducting condition.

4. A pulse height discriminating circuit adapted to generate an output pulse for each input pulse applied thereto in excess of a predetermined threshold amplitude comprising, first and second electron tubes each having at least an anode, a cathode and a control grid, means coupling the anode of said first tube to the control grid of said second tube so that the voltage of the control grid of the second tube varies according to that of the anode of the first tube, a positive feedback circuit comprising a capacitor only connected from the cathode of said second tube to the cathode of said first tube, voltage clamping means including a diode connected from the anode of said first tube to a point of reference potential, means for supplying operating voltages to each said tube so that each tube is in a conducting state in the quiescent condition of the circuit with the diode of said voltage clamping means conducting and stabilizing the current in the first tube, an input circuit connected to the control grid of said first tube for applying positive voltage pulses thereto, said reference potential being of such magnitude that said diode is rendered non-conducting upon application to said input circuit of a pulse in excess of said threshold amplitude whereby said voltage clamping means ceases to stabilize the current in said first tube permitting the loop gain of said first and second tubes connected as aforesaid to increase and causing generation of an output pulse at the anode of said second tube, the determining time constant for said output pulse being the product of the capacitance of said capacitor and the terminal resistance of said first and second tubes in series.

5. A pulse height discriminating circuit as defined in claim 4 in which said diode is connected in series with a parallel resistance-capacitance combination in the order named between the anode of said first tube and a point of ground potential with said diode having its positive pole connected to the anode of said first tube.

6. A pulse height discriminating circuit as defined in claim 4 in which said diode has its positive pole connected to the anode of said first tube and its negative pole connected to a source of voltage of a magnitude to allow current flow in said diode during the absence of input pulses to said input circuit in excess of said threshold amplitude.

7. A pulse height discriminating circuit as defined in claim 4 in which said diode has its positive pole connected to the anode of said first tube and its negative pole connected to a predetermined point on the cathode load of said second tube.

References Cited in the file of this patent

UNITED STATES PATENTS

| | | |
|---|---|---|
| 2,381,920 | Miller | Aug. 14, 1945 |
| 2,418,364 | Moe | Apr. 1, 1947 |
| 2,435,207 | Dimond | Feb. 3, 1948 |
| 2,494,353 | Newman | Jan. 10, 1950 |
| 2,543,462 | Longmire | Feb. 27, 1951 |
| 2,644,887 | Wolfe | July 7, 1953 |
| 2,683,806 | Moody | July 13, 1954 |